UNITED STATES PATENT OFFICE.

ADOLF H. HIRSH, OF CHICAGO, ILLINOIS.

IMPROVEMENT IN THE MANUFACTURE OF SUGAR FROM CORN.

Specification forming part of Letters Patent No. 58,824, dated October 16, 1866.

*To all whom it may concern:*

Be it known that I, ADOLF HENRY HIRSH, of the city of Chicago, county of Cook, and State of Illinois, have invented a new and improved method or process of manufacturing a sirup and sugar resembling maple-sirup and maple-sugar in its properties and applications from maize or Indian corn or other cereals containing starch; and I do hereby declare that the following is a full and exact description thereof, to enable others skilled in the art to which it belongs to manufacture sugar and sirup according to the principles of my said invention and improvement.

*First degree.*—In the first place I take about five thousand (5,000) pounds of Indian corn or maize, or other cereals containing starch, and soak it in a suitable tank or vat in highly-diluted sulphuric acid at an elevated temperature until the grain becomes soft.

The diluted acid I prepare in such proportions as to mix one-quarter or one-half pound of the commercial acid with one hundred pounds of water. Of this diluted acid I put enough into the tank mentioned above to cover the grain contained therein. I then heat the mass by the aid of steam to a temperature of not exceeding 170° on Fahrenheit's thermometer. The steam I apply by means of a mashing-machine, as used in distilleries or breweries, and consisting of steam-pipes which are constantly revolving by means of appropriate cog-wheels and stuffing-boxes to prevent leakage. Thereby I gain a uniform mixture and an equalization of heat in the mass of acid and grain.

In the absence of a mashing apparatus, I apply the steam directly or through a coil under a false bottom in the vat containing the grain and acid, whereby I prevent the contact of the steam with the grain itself, which, by the high temperature of the former, might be made pasty, and then be spoiled for the present purpose of preserving the starch in its raw unchanged state.

The elevated temperature of the mixture accelerates the softening of the grain, which is permeated by the diluted sulphuric acid. The latter, coming into intimate contact with the gluten of the grain, unites with it to an insoluble spongy compound the sulpho-proteic acid, which is easily removed at a subsequent period of the process, to be described hereinafter. This step in the preparation of the starch from the corn differs materially from the old processes found described.

The old mode of extracting the starch from the corn consists in soaking the corn in cold water, or in water heated only a few degrees above the normal temperature—never above 70° Fahrenheit, and that in winter only. This softens the grain but slowly, eight to fifteen days being requisite for the purpose, while the much greater heat at which I apply the diluted acid produces the softening of the grain in less than half the usual time. On softening of the husk according to the old slow method the gluten frequently putrefies, (always in summer,) causing an unpleasant, unhealthy odor of sulphureted hydrogen, which is increased, if, as some manufacturers do, alkali is added to the water covering the grain.

The chemicals I use in this process are never used by others at this stage of the same, nor at any stage for this purpose. Sulphuric acid is generally used at the subsequent process of converting the starch into sugar; but for the removal of the gluten in the insoluble state of sulpho-proteic acid it never has been employed, the old manner in use now being the treatment with caustic soda, which dissolves the gluten, but only after repeated applications, occupying three weeks' time in our best starch-factories. This tedious and expensive use of alkali I discard entirely.

Within two or three days after the application of the acid the corn or other grain is soft enough for grinding, which I perform accordingly in suitable mills of stone or iron, or between rollers. This crushed mass of maize or other grain I pass through suitable sieves, which retain the husks, while a milky substance, consisting of starch, water, sulpho-proteic acid, and finely-ground husks, passes through the meshes and run upon a broad inclined plane, (gutter,) having an incline of one inch to every twenty feet of length, and which is two or three hundred feet long.

If the room at command does not permit the use of gutters of that length, they may be constructed in short sections placed above each other.

Upon this inclined plane or planes the starch is deposited by its great specific gravity, while the water, the light sulpho-proteic acid, and finely-ground husks that had passed through the sieve float off, and may be used with the husks as cattle-feed.

The starch left upon this inclined plane I place into suitable vats, where I wash it with water containing one per cent. of spirits of ammonia. This will dissolve any gluten that may not have been reached by the former treatment with acid. As soon as the starch has subsided to the bottom of the vat in which I wash it, I withdraw the ammoniacal solution of gluten from the top, and wash the starch with pure water once or twice, until all alkaline reaction is removed.

The presence of alkali I consider positively injurious to my process, as the alkali would not only cause an unnecessary expense of acid by partly neutralizing the same, but the sulphate formed would also, by its presence in the sirup, give it an unpleasant taste.

The starch remains in great purity at the bottom of the tank. It differs from commercial starch by containing no trace of gluten, nor even a slight alkaline reaction, either of which is present in all commercial starch, according to its preparation with alkali or without chemicals; and it is this superior purity of the starch prepared according to my mode, described just now, over other starch made from cereals which I claim as a superior result of my improved process.

The starch in its present state also differs from commercial starch in the water it contains, which in the latter is removed in the subsequent drying process. This constitutes the first degree or first manipulation in my process.

*Second manipulation.*—I now have prepared and ready for use another vat or tank, made of wood, or made of iron lined with lead to prevent corrosion. The tank contains a mashing-machine, as used in the first stage of my process, consisting of appropriate cog-wheels, steam-pipe, and stuffing-boxes, so as to keep, by the motion of the apparatus, the contents (to be described hereinafter) in constant motion, which accelerates the chemical process by bringing chemicals and the starchy part into more frequent and more intimate contact.

In the absence of a mashing apparatus, I make the discharge-openings for the steam very small, so as to insure pressure, and by the same constant motion in the boiling liquid. In both cases I use direct steam in the liquid in preference to the use of the coil, as I thereby insure a more economical use of the steam as a source of heat, as well as that of a motive power, by keeping the boiling mass in commotion. Into this tank I place about five hundred (500) pounds of water, and admit steam through the appropriate stop-cocks, causing the water in the tank to boil. Then I pour into it about eighty pounds of sulphuric acid, about five pounds of the sulphate of alumina, and about fifteen pounds of finely-powdered coke or vegetable charcoal.

This joint use of the alumina and charcoal for the production of a pure saccharine solution I claim to be an improvement over the old methods, which, dispensing with the alumina, required a longer time for the clarification of the sweet liquid by rest, the light porous particles of charcoal floating persistently in the dense liquid, while they would pass through any bag-filter that would permit the percolation of the saccharine liquid with anything like practical rapidity.

The flocculent alumina on the other hand envelops, as mentioned before, the charcoal and other impurities, and by its great specific gravity carries them with itself to the bottom, leaving the saccharine liquid soon in a limpid state, when it requires either no filtration, or, upon filtration, passes through the filtering medium with great rapidity, acquiring superior brightness.

I take well care not to add the acid before the water has attained the boiling-point, as the long contact of the same with the wood alone would gradually convert it into humus, which, increasing by the long continuance of such a practice, injures the taste of the sirup, rendering the same what is termed "clayey."

As soon as the chemicals are mixed with the boiling water I admit the starch, as prepared in the first degree of my process, after having mixed the same with sufficient water to give it the consistency of cream, taking well care that the volume of this cream added to the volume of the boiling water in the vat fills only two-thirds of the latter, so as to leave sufficient space for the water accumulating afterward from the condensation of the steam.

I admit the starch in its creamy consistency in several small streams into the boiling mixture of water and chemicals, which are constantly kept in motion by the mashing apparatus or the vehement afflux of steam, and keep the mixture boiling for the space of from two to six hours, according to the pressure of the steam used in treating the liquid, the time for boiling being shortened with the increase of pressure and temperature.

I boil the liquid until the starch is completely saccharified. As soon as this has taken place I shut off the steam and add freshly-slaked lime stirred up in water to the consistency of milk until the liquid reddens litmus but slightly, when I add common chalk until all effervescence ceases. For the above proportions of acid I use about eighty pounds of lime and ten of chalk. By these means no free caustic lime remains in the liquid, so as to deteriorate it, as would be the case if the neutralization were completed with quicklime, which might render the sirup bitter.

The sulphate of alumina which I prepare in the usual mode, becomes also decomposed by the lime and chalk, which appropriate the sulphuric acid, while the hydrate of alumina in its nascent flocculent state facilitates the precipitation of the gypsum and of other impurities collected and absorbed by the charcoal or coke, replacing in its action blood, which is used in the old process of defecation. The use of charcoal or coke I consider the best; but it may also be replaced by animal charcoal, in which case I soak the same for twenty-four hours prior to using it in muriatic acid containing six per cent. of the concentrated acid, and remove again the acid completely by washing the charcoal with pure water.

The manner of using the charcoal—*i. e.*, its presence during the entire process of saccharification—will render its use more efficacious than its application for only a few minutes, as indicated in the patent of Goessling, where it is introduced only at or about the time of neutralization, and is soon again removed. Every chemical process requires time, and especially that of absorption which in the manner proposed by me at present is more complete than in others in use heretofore in the manufacture of corn-sugar, the charcoal absorbing here any impurities like newly-formed humus, &c., as fast as it is produced, and preventing its accumulation.

After the addition of the chalk I take care not to heat the liquid anew, so as to avoid the deleterious action which lime exerts upon sirup at a higher temperature. I then pass the liquid through a bag-filter, which permits only the clear saccharine liquid to pass, while it retains the precipitated salts of lime and the alumina and charcoal, or equivalent. This residue may be entirely freed from any saccharine liquid by steaming and pressure.

The long-continued action of the charcoal, combined with the purifying action of the alumina, removes all foreign substances so completely that the filtered liquid will contain but pure sugar.

This completes the second manipulation of my process.

*Third manipulation.*—The third manipulation of my process divides into two different branches, according to the object in view of producing sirup or sugar.

For the latter purpose I place the saccharine liquid, as prepared in the second manipulation of my process, immediately into a vacuum-pan, adding again about ten pounds of charcoal, coke, or bone-black, (powdered,) and evaporated to the consistency of 35° on Baumé's saccharometer.

As mentioned in the second degree of my process, here again the constant presence of charcoal or equivalent is an improvement upon former methods, the charcoal absorbing any products of the decomposition of sugar that may be formed by the action of heat, and of a minute quantity of gypsum held in solution, as fast as they are formed, preserving the sugar in such purity as will favor best its crystallization.

I then pass the sirup hot through a bone-black filter, allowing the liquid to enter the filter at its bottom, and to rise by hydrostatic pressure to the top, where the sirup runs off clear, transparent, and limpid, while the pores of the filter retain the powdered bone-black, or equivalent, and gypsum previously held in solution by the sirup. The latter I then run into molds, where the sugar will crystallize within a few days, when I treat it like ordinary sugar.

For the second branch of the third manipulation—the manufacture of sirup—I use an open flat pan or evaporator, in which the saccharine liquid passes in a stratum one inch high, running in and out continually, while steam or direct fire is the heating medium. The saccharine liquid here gets heated to over 140° Fahrenheit, and the sugar naturally gets changed into uncrystallizable sugar, glucose, or fructose of the composition $C_{12}H_{12}O_{12}$. This decomposition does not need to take place completely, as the glucose will prevent the crystallization of an equal weight of crystallizable sugar.

The old method of preparing starch-sirup (which will preserve its liquid state) consisted in carrying the saccharification only to such a degree that about one-half of the starch remained unconverted, or was converted only into gum-dextrine, which prevented the crystallization of the sugar contained in the sirup; or a certain quantity of such gum-sirup was added to the saccharine solution, as in the Goessling patent.

The method proposed by me now converts grape-sugar into fruit-sugar, which, although not capable of crystallization, and while it prevents the crystallization of its own weight of sugar, still adds to the sweetness of the sirup, which is not the case with dextrine or gum-dextrine, the latter diluting the saccharine solution, and thereby diminishing its relative sweetness.

The resulting sirup resembles maple-sirup very closely, as well as the sugar, which, by the purifying action of the charcoal during evaporation, is rendered exceedingly pure, and resembles maple-sugar.

This completes the third and last manipulation of my process, which produces, upon an average, twenty-five pounds of sugar resembling maple-sugar, or about thirty pounds of maple-like sirup, from one bushel of Indian corn or maize.

When other cereals are subjected to this process in place of maize, they should be used in such quantities that the amount of starch contained therein equals (about) the quantity of starch contained in maize, having reference to relative proportion of grain and chemicals.

What I claim as my invention, and desire to secure by Letters Patent, is—

1. The application of diluted acid at an elevated temperature in the process of making starch from maize and other cereals, for the purpose of making sirup and sugar therefrom, substantially in the manner set forth and specified in the first manipulation.

2. Treating saccharine liquids with alumina and charcoal, coke, or bone-black combined, substantially as and for the purpose set forth.

3. The within-described process of manufacturing sirup and sugar from corn or other grain, consisting of three subsequent manipulations, substantially each as set forth.

In testimony whereof I have hereunto set my signature.

ADOLF HENRY HIRSH.

Witnesses:
A. NEILL,
JNO. H. SMITH.